United States Patent
Takeyama et al.

(10) Patent No.: US 10,076,722 B2
(45) Date of Patent: Sep. 18, 2018

(54) GAS-LIQUID CONTACT DEVICE, DISTILLATION DEVICE, AND HEAT EXCHANGE DEVICE

(71) Applicant: Nippon Refine Co., Ltd., Anpachi-gun, Gifu (JP)

(72) Inventors: Tomokiyo Takeyama, Tokyo (JP); Akiyoshi Oda, Tokyo (JP); Yasuhito Kawase, Tokyo (JP); Taijun Kawase, Tokyo (JP)

(73) Assignee: Nippon Refine Co., Ltd., Anpachi-gun, Gifu (JP)

( * ) Notice: Subject to any disclaimer, the term of this patent is extended or adjusted under 35 U.S.C. 154(b) by 1133 days.

(21) Appl. No.: 14/364,893

(22) PCT Filed: Dec. 7, 2012

(86) PCT No.: PCT/JP2012/081794
§ 371 (c)(1),
(2) Date: Oct. 9, 2014

(87) PCT Pub. No.: WO2013/089035
PCT Pub. Date: Jun. 20, 2013

(65) Prior Publication Data
US 2015/0136582 A1  May 21, 2015

(30) Foreign Application Priority Data

Dec. 12, 2011  (JP) ................. 2011-271755

(51) Int. Cl.
*B01D 53/18* (2006.01)
*B01J 19/32* (2006.01)
(Continued)

(52) U.S. Cl.
CPC ............. *B01D 53/185* (2013.01); *B01D 1/26* (2013.01); *B01D 3/324* (2013.01);
(Continued)

(58) Field of Classification Search
CPC ...... B01D 53/14; B01D 53/18; B01D 53/185; B01D 53/78; B01J 19/30; B01J 19/32; B01J 2219/32425
See application file for complete search history.

(56) References Cited

U.S. PATENT DOCUMENTS 3,927,165 A   12/1975  Grochol et al.
4,719,090 A   1/1988   Masaki
(Continued)

FOREIGN PATENT DOCUMENTS

CN         101940907         1/2011
DE    10 2010 00276 A1       9/2011
(Continued)

OTHER PUBLICATIONS

Reconsideration Report for Japanese Patent Application No. 2011-271755 (dated May 31, 2016.
(Continued)

*Primary Examiner* — Renee E Robinson
(74) *Attorney, Agent, or Firm* — Merchant & Gould P.C.

(57) ABSTRACT

Provided is an NMP recovery system 1 for causing NMP-containing gas to contact NMP-absorbing water, including: fillers (10A) to (10D) that are permeable to the water and hold the water, wherein the permeated water moves according to gravity to flow out from the fillers; an NMP-containing gas distribution unit (30) for distributing the NMP-containing gas so as to cause the NMP-containing gas to contact the water held by the fillers (10A) to (10D); and a water distribution unit (40) for distributing the water so as to make the water permeate through the fillers (10A) to (10D). In the fillers (10A) to (10D), the NMP-containing gas is made to contact the NMP-absorbing water. Accordingly, NMP in the NMP-containing gas is absorbed in the water, so that the NMP is separated from the NMP-containing gas.

2 Claims, 11 Drawing Sheets

(51) Int. Cl.
   *F28F 25/08*   (2006.01)
   *B01D 53/14*   (2006.01)
   *B01D 1/26*    (2006.01)
   *B01D 3/32*    (2006.01)
   *B01D 53/78*   (2006.01)

(52) U.S. Cl.
   CPC ......... *B01D 53/1487* (2013.01); *B01D 53/18* (2013.01); *B01D 53/78* (2013.01); *B01J 19/32* (2013.01); *F28F 25/087* (2013.01); *B01D 53/14* (2013.01); *B01D 53/1406* (2013.01); *B01D 2252/103* (2013.01); *B01D 2257/40* (2013.01); *B01D 2257/708* (2013.01); *B01J 2219/3221* (2013.01); *B01J 2219/3222* (2013.01); *B01J 2219/32213* (2013.01); *B01J 2219/32268* (2013.01); *B01J 2219/32272* (2013.01); *B01J 2219/32425* (2013.01)

(56) References Cited

U.S. PATENT DOCUMENTS

| | | |
|---|---|---|
| 4,882,130 A | 11/1989 | Asai et al. |
| 5,536,454 A | 1/1996 | Fujii et al. |

FOREIGN PATENT DOCUMENTS

| | | |
|---|---|---|
| JP | 50-16670 A | 2/1975 |
| JP | 2-207837 A | 8/1990 |
| JP | 6-82192 A | 3/1994 |
| JP | 6-210121 A | 8/1994 |
| JP | 6-285357 A | 10/1994 |
| JP | 11-156148 A | 6/1999 |
| JP | H11 156148 A | 6/1999 |
| JP | 2002-177701 A | 6/2002 |
| JP | 2004-305919 A | 11/2004 |
| JP | 2008-104948 A | 5/2008 |
| JP | A-2010-201282 | 9/2010 |
| JP | A-2003-326102 | 9/2011 |
| TW | B-1255732 | 6/2006 |
| WO | WO 03/047747 | 6/2003 |
| WO | WO 2009/055419 A1 | 4/2009 |

OTHER PUBLICATIONS

Taiwanese Office Action for Taiwanese Patent Application No. 101146539 (dated Jul. 23, 2015).
Chinese Examination Report for Chinese Patent Application No. 201280061114.6 (dated Jun. 25, 2015).
International Search Report for International Patent Application No. PCT/JP2012/081794 (dated Feb. 26, 2013).
Taiwanese Office Action for Taiwanese Patent Application No. 101146539 (dated Dec. 25, 2014).
European Search Report for European Patent Application No. 12858032.1 (dated Sep. 4, 2015).

GAS-LIQUID CONTACT DEVICE, DISTILLATION DEVICE, AND HEAT EXCHANGE DEVICE

This application is a U.S. National Stage Application under 35 U.S.C. § 371 of International Patent Application No. PCT/JP2012/081794 filed 7 Dec. 2012, which claims the benefit of priority to Japanese Patent Application No. 2011-271755 filed 12 Dec. 2011, the disclosures of all of which are hereby incorporated by reference in their entireties. The International Application was published in Japanese on 20 Jun. 2013 as WO 2013/089035.

TECHNICAL FIELD

The present invention relates to gas-liquid contact devices, and more specifically to a gas absorber (or recovery device) (including a gas-cooling condenser (or a heat exchange device)), an evaporator, and a distillation device (e.g., purifier). Examples of the gas include volatile organic compounds (VOC) such as NMP. Examples of the gas absorber include a VOC absorber.

BACKGROUND ART

A large volume of organic solvents (e.g., an absorbable material, a volatile organic compound) such as NMP (N-methyl-pyrrolidone) are discharged during a process of manufacturing a secondary battery such as a lithium ion battery. Accordingly, it is desirable to develop a technology to recover the organic solvents.

Note that in a negative electrode slurry used to form a negative electrode, for example, NMP is used as a solvent (i.e., a mixed solvent) to dissolve a negative electrode conductive agent (e.g., carbon) and polyvinylidene difluoride (PVDF) as a binder.

Next, the negative electrode slurry containing NMP as a mixed solvent is applied on an electrode plate. Then, the plate is dried with a hot air drier. Accordingly, the NMP is vaporized in hot air during the drying. After that, exhaust gas containing vaporized NMP is discharged.

It is important to separate and recover the organic solvents, such as NMP included in such exhaust gas, from the exhaust gas. The applicant of the present application has disclosed various technologies for their separation and recovery (see JP2010-201282A).

CITATION LIST

Patent Literature

[Patent Literature 1] JP2010-201282A

SUMMARY OF INVENTION

Technical Problem

Here, it is the first object of the present invention to provide a gas-liquid contact device allowing for preferential separation of an absorbable material such as NMP. In addition, it is the second object of the present invention to provide a distillation device allowing for preferential distillation of a source material containing a low boiling point substance and a high boiling point substance. Further, it is the third object of the present invention to provide a heat exchange device allowing for preferential cooling and heating of gas.

Solution to Problem

In order to provide a solution to the above problem, an aspect of the present invention provides a gas-liquid contact device for causing gas containing an absorbable material to contact liquid absorbing the absorbable material, including: a filler that is permeable to the liquid (water and/or an organic solvent) and holds the liquid, wherein the permeated liquid moves according to gravity (self-weight) to flow out from the filler; a gas distribution unit for distributing the gas so as to cause the gas to contact the liquid held by the filler; and a liquid distribution unit for distributing the liquid so as to make the liquid permeate through the filler, wherein in the filler, the gas containing the absorbable material is made to contact the liquid absorbing the absorbable material; and the absorbable material included in the gas is absorbed in the liquid and is separated from the gas.

As used herein, liquid absorption of an absorbable material includes, for example, a form in which the absorbable material is dissolved and/or dispersed in liquid.

Such a gas-liquid contact device is used to make the liquid distributed by the liquid distribution unit permeate through the filler. Meanwhile, the gas distributed by the gas distribution unit is made to contact the liquid held by the filler.

That is, in the filler, the gas is made to contact the liquid, and the absorbable material included in the gas is absorbed in the liquid (i.e., a material is transferred) and is separated. Then, the liquid containing the absorbable material moves (migrates) inside the filler according to gravity (self-weight). After that, the liquid is discharged from the filler.

In such a manner, the gas containing the absorbable material is made to contact the liquid held by the filler, so that the absorbable material included in the air can be absorbed in the liquid and can be separated from the gas.

In addition, it is preferable for the liquid distribution unit to inject liquid from a portion over the filler in the gas-liquid contact device.

In such a gas-liquid contact device, liquid is injected from a portion over the filler by an absorption medium distribution unit, so that the liquid can easily permeate through the filler from its upper portion. This makes it better and easier to replace liquid in the filler.

In addition, in the gas-liquid contact device, it is preferable for the liquid distribution unit to supply the filler with liquid that has absorbed the absorbable material and flows out form the filler, thereby circulating the liquid through the filler.

In such a gas-liquid contact device, the liquid distribution unit supplies the filler with liquid that has absorbed the absorbable material and flows out from the filler. As a result, the liquid is made to circulate via the filler. In this way, the liquid circulates through the filler. Consequently, the concentration of the absorbable material in the liquid gradually increases during the circulation. As a result, the absorbable material can be enriched.

In addition, in the gas-liquid contact device, the filer preferably includes a plurality of stacked ceramic sheets having a wavy cross-section. It is also preferable to cause gas to pass through an inter-sheet space of the plurality of sheets, so that in the filler, a gas flow direction may be perpendicular to a liquid flow direction.

In such a gas-liquid contact device, the gas flows through the inter-sheet space of the plurality of ceramic sheets having a wavy cross-section. Then, in the filler, the gas flow direction may be perpendicular to the liquid flow direction. This configuration enables the gas to better contact the liquid held by adjacent sheets.

In addition, the gas-liquid contact device preferably further includes: a plurality of the fillers arranged in series in the gas flow direction; the liquid distribution unit that is installed for each filler; and a liquid supply unit for supplying the liquid distribution unit that is positioned at an upstream side in the gas flow direction with the liquid discharged from the filler.

In such a gas-liquid contact device, the gas serially flows through the plurality of fillers. Thus, the filler at the upstream end has a larger amount of absorption of an absorbable material to be absorbed by liquid. As the liquid is located at a more downstream side, the amount decreases.

In addition, the liquid supply unit supplies a liquid distribution unit that is located upstream in the gas flow direction with liquid that has been discharged from the filler and contains the absorbable material. That is, the liquid supply unit supplies the upstream liquid distribution unit with the liquid that has been discharged from the downstream filler and contains less amount of the absorbable material. Thus, as the liquid is positioned more upstream in the gas flow direction, the absorbable material can be more enriched.

In addition, another aspect of the present invention provides a distillation device (or distillator) allowing for distillation of a source material containing a low boiling point substance and a high boiling point substance, including: a filler that is permeable to the source material and holds the source material, wherein the permeated source material moves according to gravity (self-weight) to flow out from the filler; a reboiler for heating the source material to generate vapor; a vapor pipe for distributing the vapor that has been generated in the reboiler and flows toward the filler; a condenser for cooling the vapor from the filler to produce a condensate; and a condensate pipe for returning the condensate produced in the condenser to the filler, wherein in the filler, the vapor is made to contact the condensate or the source material held by the filler.

In such a distillation device (or distillator), the filler holds a source material or a condensate. Then, in the filler, the vapor generated in the reboiler is made to contact the source material or the condensate held by the filler, so that the heat of the high boiling point substance is transferred to the low boiling point substance. This enables distillation to proceed. As the vapor passes through the filler, this process can gradually increase an amount of the low boiling point substance in the vapor. Further, the vapor discharged from the filler is cooled down in the condenser to produce a condensate having the low boiling point substance as a principal component.

By contrast, although the high boiling point substance is once vaporized, the substance is likely to liquefy afterward. Accordingly, the high boiling point substance moves inside the filler and easily flows out from the filler. In this way, a residual liquid discharged from the filler has the high boiling point substance as a principal component.

This allows for preferential distillation of the source material and makes it possible to separate the low boiling point substance from the high boiling point substance.

In addition, in the above distillation device, the filer preferably includes a plurality of stacked ceramic sheets having a wavy cross-section. It is also preferable to cause vapor to pass through an inter-sheet space of the plurality of sheets, so that in the filler, a vapor flow direction may be perpendicular to a source material or condensate flow direction.

In such a distillation device, the vapor flows through the inter-sheet space of the plurality of ceramic sheets having a wavy cross-section. Then, in the filler, the vapor flow direction may be perpendicular to the source material or condensate flow direction. This configuration enables the vapor to better contact the condensate or the source material held by adjacent sheets.

In addition, another aspect of the present invention provides a heat exchange device for performing heat exchange between gas and liquid which is either a cooling liquid that cools the gas or a heating liquid that heats the gas, including: a filler that is permeable to the liquid and holds the liquid, wherein the permeated liquid moves according to gravity (self-weight) to flow out from the filler; a gas distribution unit for distributing the gas so as to cause the gas to contact the liquid held by the filler; and a liquid distribution unit for distributing the liquid so as to make the liquid permeate through the filler, wherein in the filler, the gas is made to contact the liquid which is either the cooling liquid or the heating liquid.

In such a heat exchange device, the filler holds liquid that is either a cooling liquid or a heating liquid. Then, in the filler, gas is made to contact the liquid that is either the cooling liquid or the heating liquid. Accordingly, efficient heat transfer can be achieved between the gas and the cooling liquid or the heating liquid. Thus, the gas can be suitably cooled or heated.

In addition, in the heat exchange device, the filer preferably includes a plurality of stacked ceramic sheets having a wavy cross-section. It is also preferable to cause gas to pass through an inter-sheet space of the plurality of sheets, so that in the filler, a gas flow direction may be perpendicular to a flow direction of the liquid that is either the cooling liquid or the heating liquid.

In such a heat exchange device, the gas flows through the inter-sheet space of the plurality of ceramic sheets having a wavy cross-section. Then, in the filler, the gas flow direction may be perpendicular to the flow direction of the liquid that is either the cooling liquid or the heating liquid. This configuration enables the gas to better contact the liquid, which is either the cooling liquid or the heating liquid, held by adjacent sheets.

Advantageous Effects of Invention

Here, an aspect of the present invention can provide a gas-liquid contact device allowing for preferential separation of an absorbable material such as NMP. In addition, another aspect of the present invention can provide a distillation device allowing for preferential distillation of a source material containing a low boiling point substance and a high boiling point substance. Further, another aspect of the present invention can provide a heat exchange device allowing for preferential cooling and heating of gas. The Detailed Description of the Invention further describes various aspects and effects as well as other effects and additional features of the present invention by referring to the attached Drawings and by using the below-described illustrative and non-limiting embodiments of the present invention,

DESCRIPTION OF EMBODIMENTS

Outline of Embodiment of Present Invention

First, the following describes a filler 10 (also referred to as an ordered filler), an essential part of an embodiment of the present invention, by referring to FIGS. 1 to 6. Note that for description clarity, the "top, bottom, left, right, front, and rear" directions are conveniently set.

<Filler>

Figure 1:
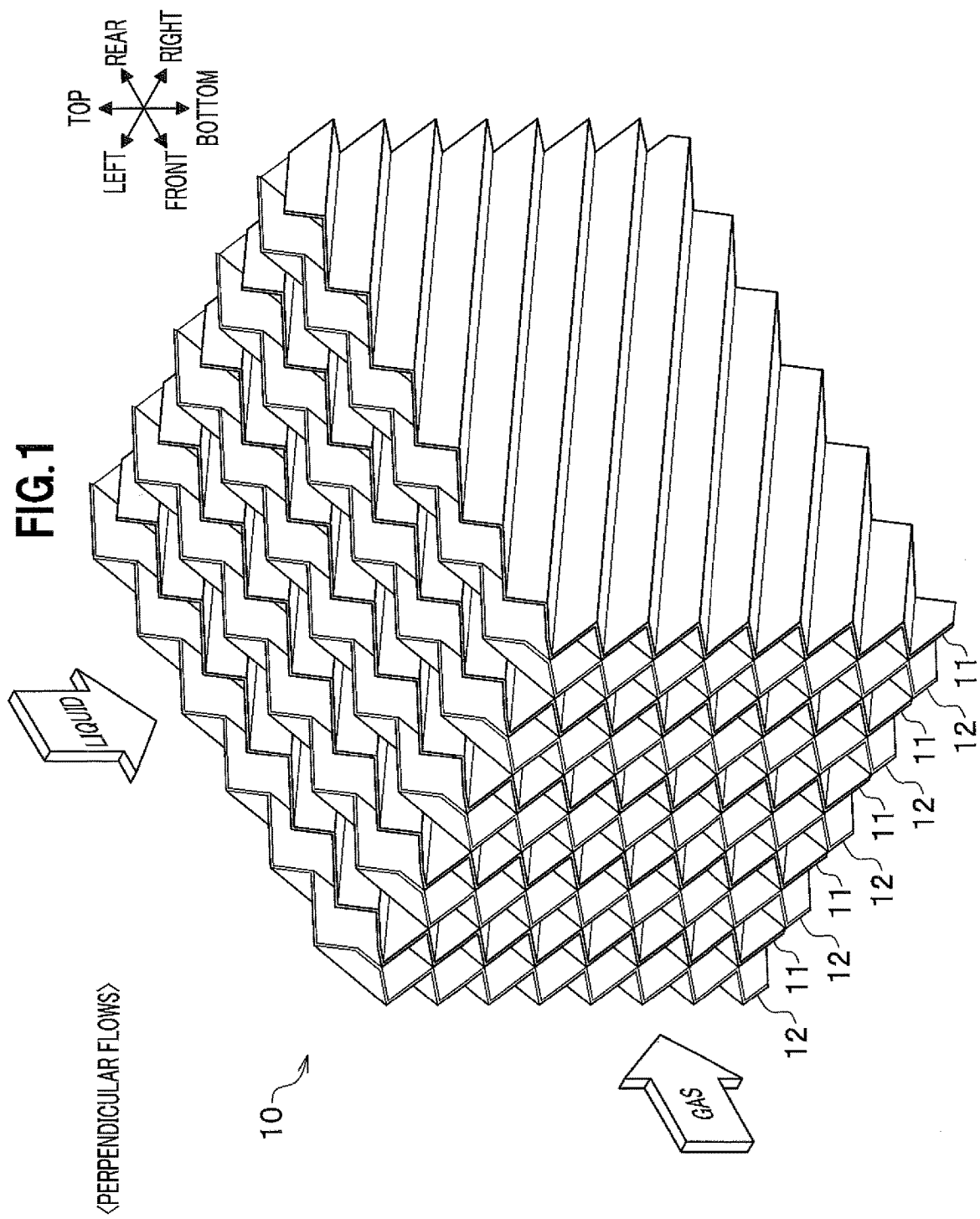
FIG. 1 is a perspective view of a filler in which flow directions are perpendicular (i.e., for perpendicular flows) according to an embodiment of the present invention.
Figure 2:
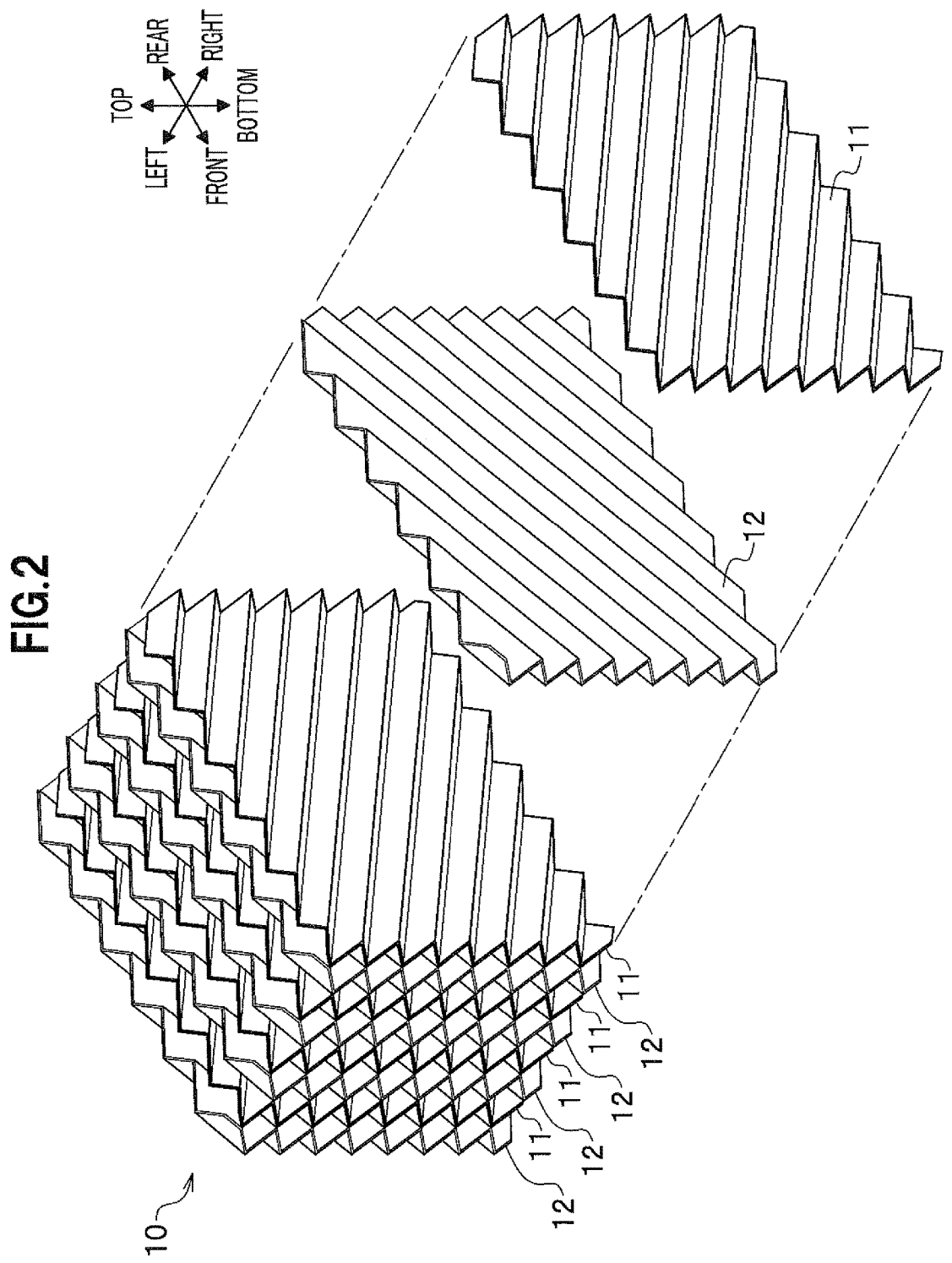
FIG. 2 is a partially exploded perspective view of the filler of FIG. 1 for perpendicular flows.
Figure 3:
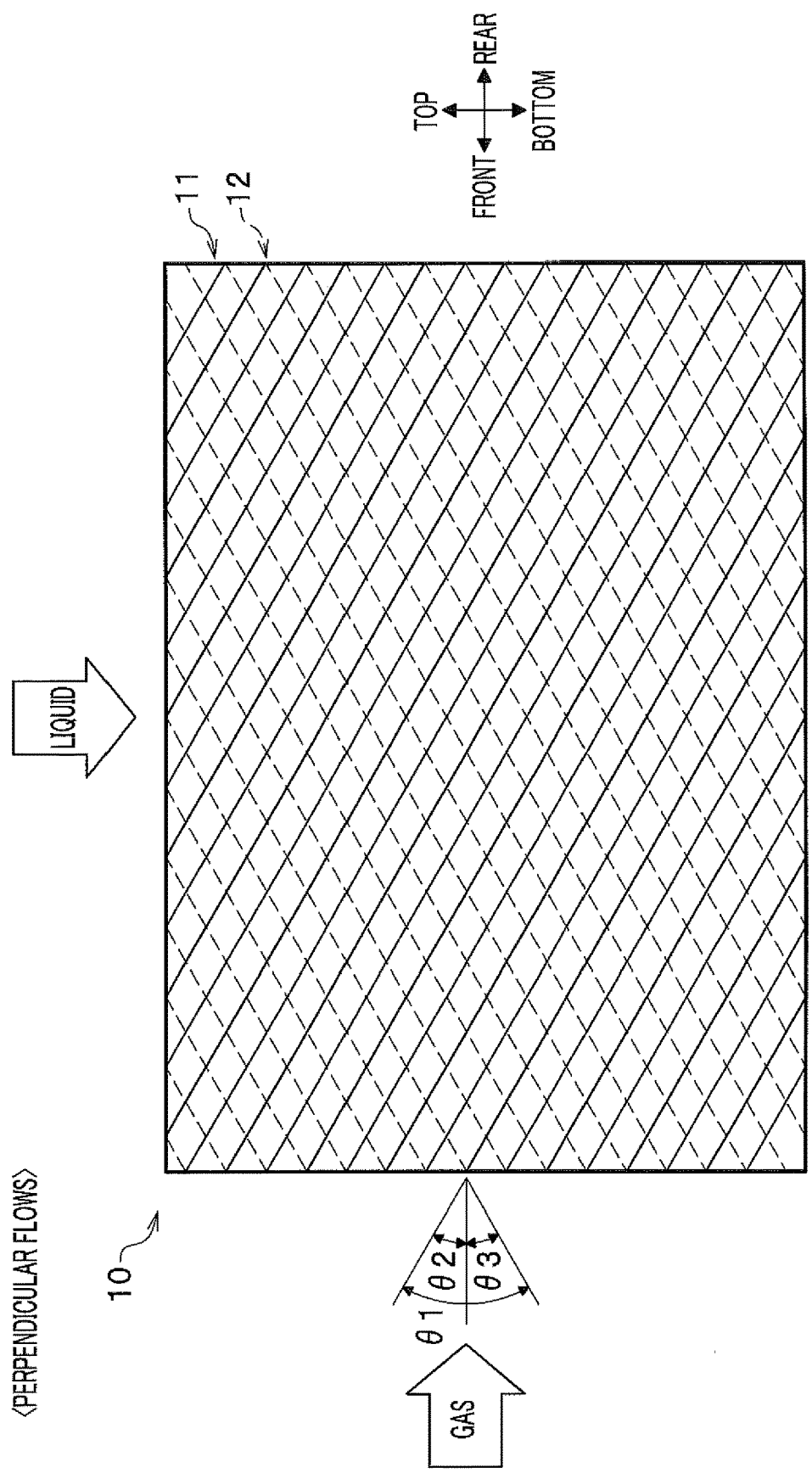
FIG. 3 is a side view of the filler of FIG. 1 for perpendicular flows.
Figure 4:
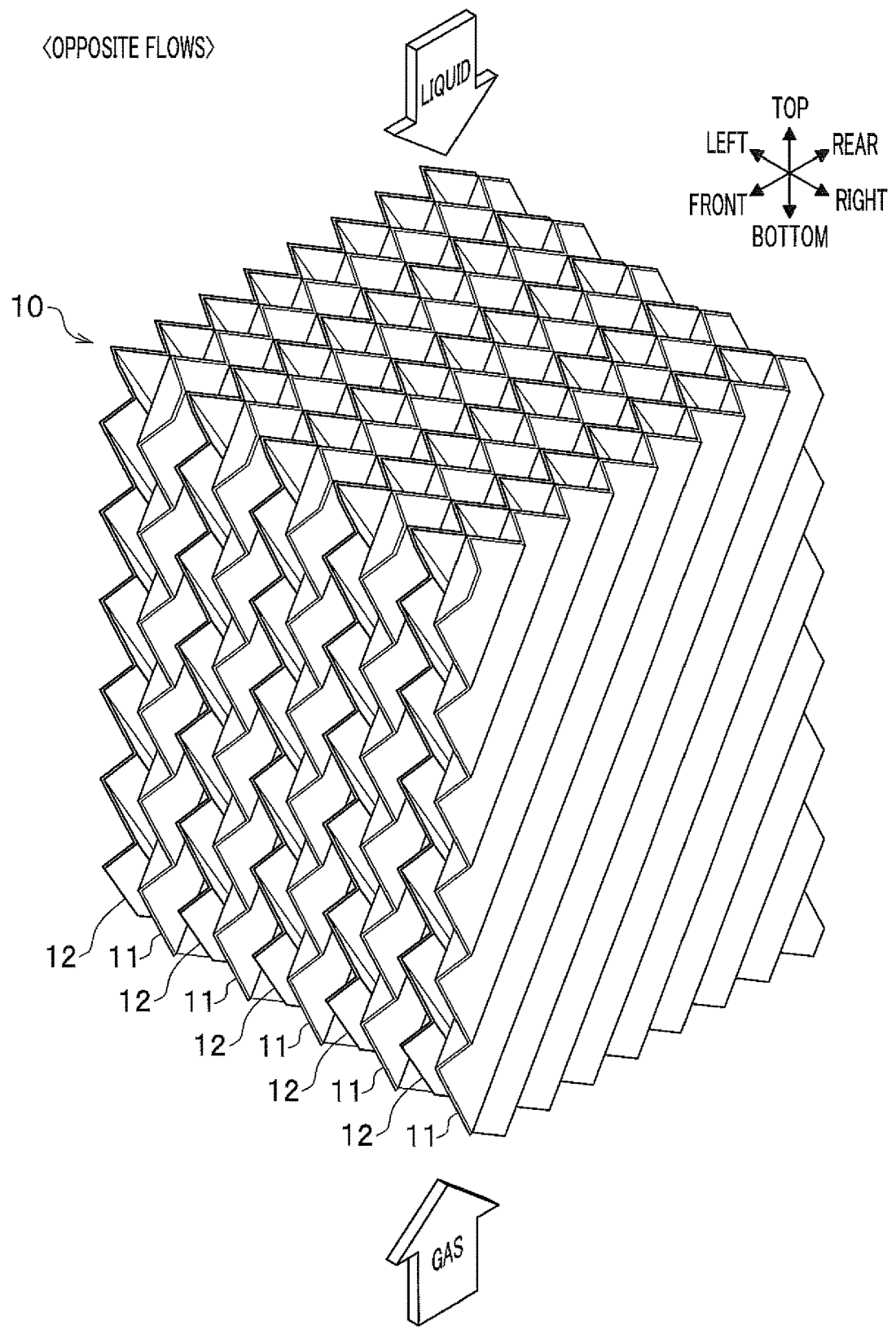
FIG. 4 is a perspective view of a filler in which flow directions are opposite (i.e., for opposite flows) according to a reference embodiment of the present invention.
Figure 5:
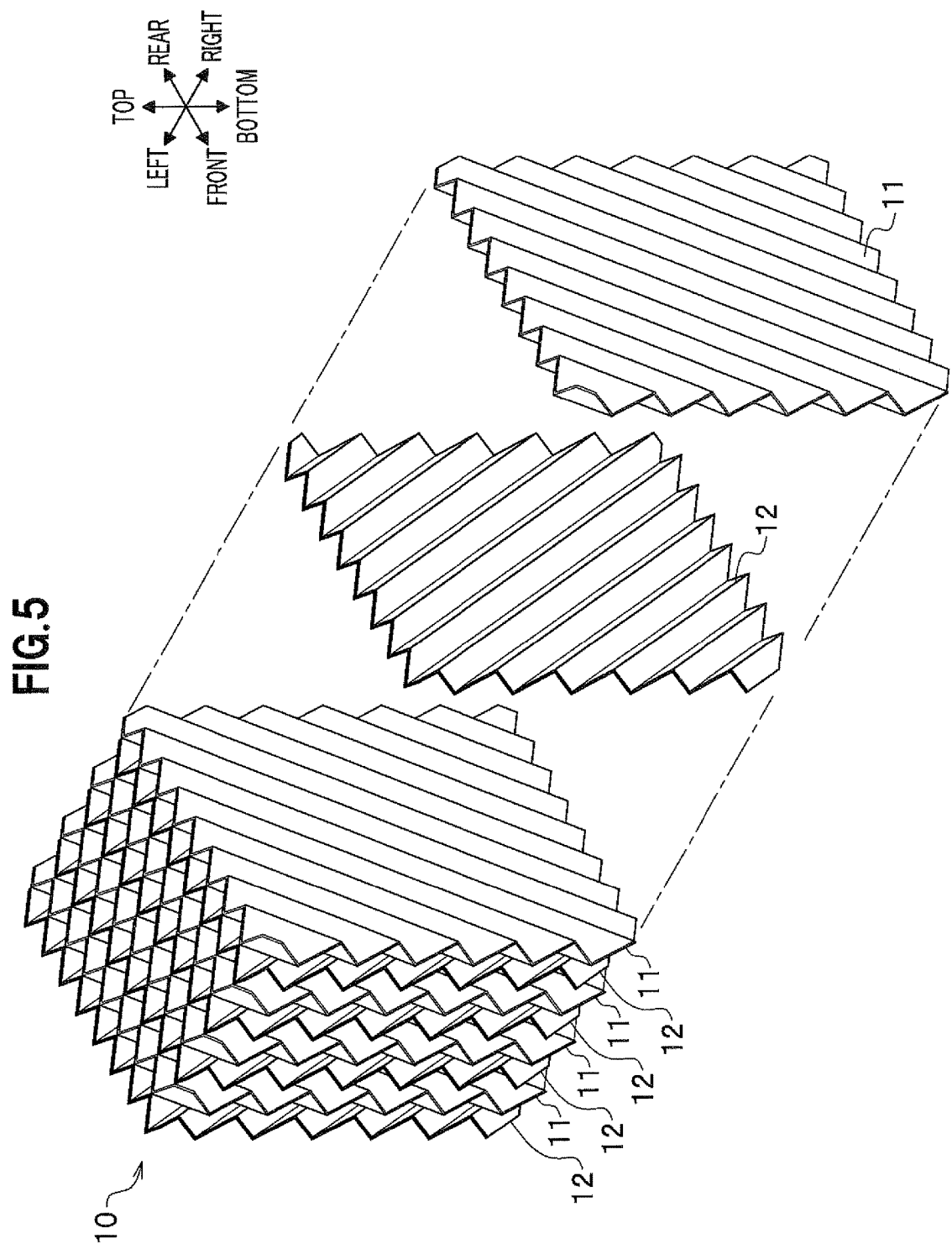
FIG. 5 is a partially exploded perspective view of the filler of FIG. 4 for opposite flows.
Figure 6:
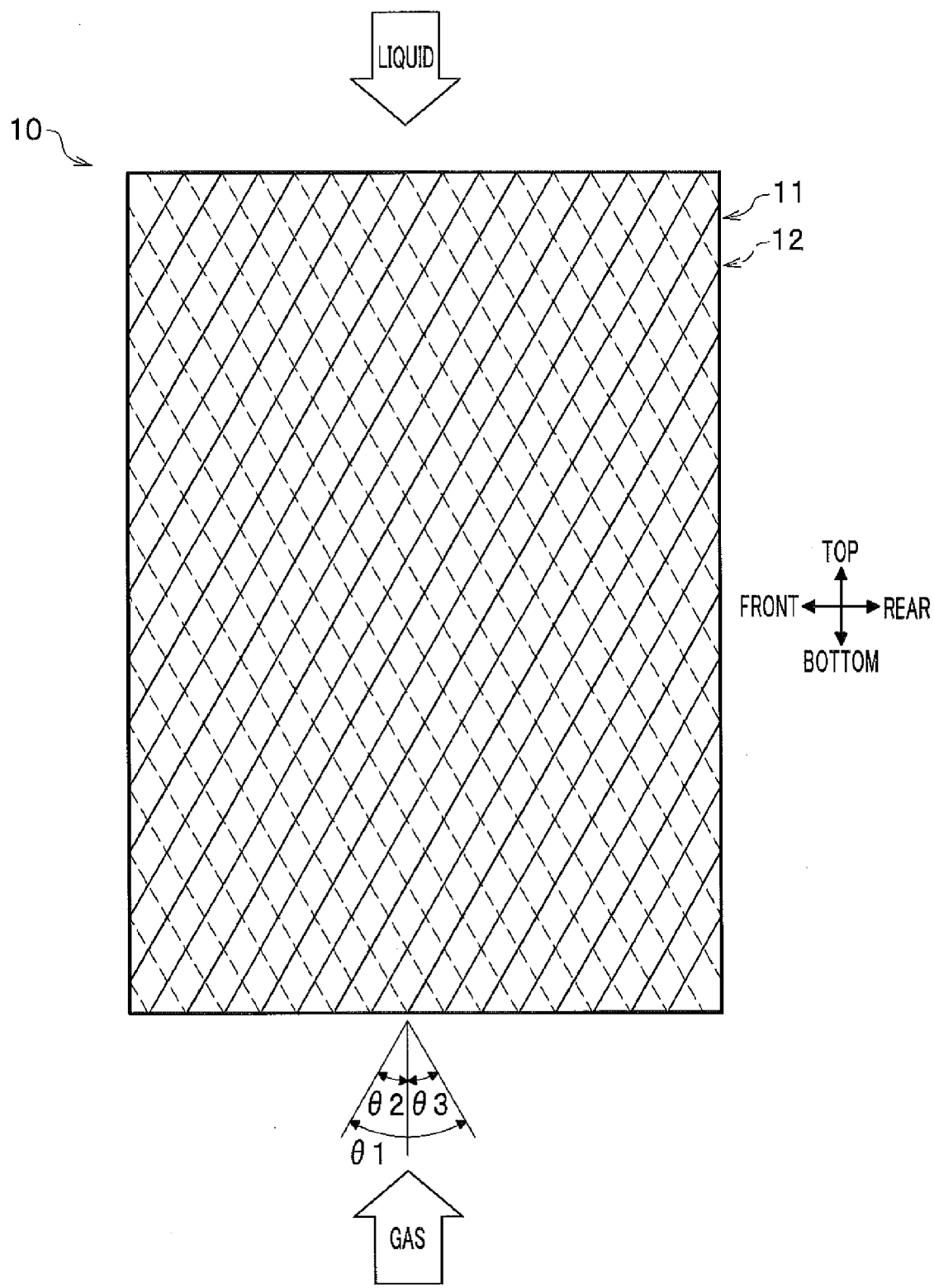
FIG. 6 is a side view of the filler of FIG. 4 for opposite flows.

Fillers 10 shown in FIGS. 1 to 6 are to efficiently achieve a gas-liquid contact between gas and liquid. The fillers 10 shown in FIGS. 1 to 6 are identical, but their spatial arrangement is different. Specifically, FIGS. 1 to 3 depict an arrangement (a lateral arrangement) when a gas flow direction is perpendicular to a liquid flow direction to achieve a gas-liquid contact. FIGS. 4 to 6 depict an arrangement (a vertical arrangement) when a gas flow direction is opposite to a liquid flow direction to achieve a gas-liquid contact.

Note that the liquid flow direction is the same as in both the lateral arrangement for perpendicular flows and the vertical arrangement for opposite flows and the liquid flows vertically downward inside the below-described sheets 11 and 12 included in the filler 10.

In addition, if the filler 10 is used in a gravity-free space, it is possible to make a gas flow direction opposite to a liquid flow direction based on a difference in density of between gas and liquid by creating a force field using, for example, centrifugal force.

The following details a laterally arranged filler 10 for perpendicular flows by referring to FIGS. 1 to 3. Then, distinct portions of a vertically arranged filler 10 for opposite flows are described by referring to FIGS. 4 to 6.

<Filler: For Perpendicular Flows>

As illustrated in FIGS. 1 to 3, when a gas flow direction is perpendicular to a liquid flow direction in the filler 10, the gas flow direction is a horizontal direction (i.e., a front-rear direction in FIGS. 1 to 3) and the liquid flow direction is a vertically downward direction.

As shown in FIG. 1, the shape of the filler 10 is substantially rectangular. The filler 10 includes a plurality of sheets 11 and 12 having a wavy cross-section and an outer frame (not shown). Then, the plurality of sheets 11 and 12 are alternately stacked in a thickness direction (i.e., a left-right direction in FIGS. 1 to 3), and are encased using the outer frame so as to keep the plurality of sheets 11 and 12 stacked.

In this regard, however, the shape of the sheets 11 and 12 are not limited to the above. Examples of the other shape may include a flat shape. In this case, the flat sheets are stacked while disposed with a gap created by, for example, a spacer. In this case, the gap between adjacent sheets is used as a gas passage.

When viewed from the thickness direction (left-right direction) of the plurality of sheets 11 and 12, the sheets 11 and 12 have different orientations of their top and bottom lines. The angle θ1 between the top line (bottom line) of the sheet 11 and the top line (bottom line) of the sheet 12 is 60 degrees. Specifically, when a gas flow direction (a front-rear direction in FIGS. 1 to 3) is used as a symmetry axis, the top line (bottom line) of the sheet 11 and the top line (bottom line) of the sheet 12 are symmetrically arranged. The angle θ2 between the top line (bottom line) of the sheet 11 and the gas flow direction is 30 degrees. The angle θ3 between the top line (bottom line) of the sheet 12 and the gas flow direction is 30 degrees (see FIG. 3). Because of this configuration, a distributed gas has a reduced pressure loss given by the filler 10.

Note that the gas passes through an inter-sheet space of the sheets 11 and 12 as so stacked in the filler 10. The traveling direction is repeatedly changed from 30 degrees upward to 30 degrees downward. Further, the gas flows while repeating branching/merging.

In this regard, however, the angles θ1 to θ3 are not limited to the above setting, but are appropriately modified.

The sheets 11 and 12 are made of a porous material such as ceramics (e.g., a compound of $SiO_2$ and $Al_2O_3$; including what is called ceramic paper) and a sintered metal compact. The sheets 11 and 12 have characteristics that make liquid such as water or an organic solvent spontaneously permeate through the sheets because of their permeability property and/or capillary phenomenon. Because of this, a holding rate (specifically, a static holding rate) at which the sheets 11 and 12 can hold (retain) a liquid is remarkably larger than that of a non-permeable metal sheet.

In this regard, however, examples of the other materials of the sheets 11 and 12 can include, but are not limited to, a sponge, woven fabric, and nonwoven fabric. Among them, examples of fiber that can be used to form the woven fabric or nonwoven fabric include glass fiber, carbon fiber, and synthetic fiber. Note that when woven or nonwoven fabric is used to construct the sheet 11, etc., a desired shape such as a wavy shape can be created by, for example, attaching the woven or nonwoven fabric to a core such as a wire netting.

Note that when the sheets 11 and 12 are made of an inorganic material such as ceramics, they are resistant to a temperature change. In addition, contamination due to an organic solvent is reduced. Further, the sheets possess acid and alkali resistance. Furthermore, the sheets 11 and 12, by themselves, have reduced dissolution. Moreover, quality management (e.g., maintenance) of the filler 10 and/or an NMP solution becomes easier, which promotes their universal use. Note that when the sheets 11 and 12 made of ceramics are used, it is preferable to perform firing pretreatment so as to keep their wavy shapes.

Here, the holding rate (a ratio of penetrated liquid, a retention rate (%)) is expressed as "a volume (L) of liquid held by a filler 10/a filling volume of the filler 10". For instance, when the filling volume of the filler 10 is 10 ($m^3$) and the holding rate is 5(%), the filler 10 holds 500 (L).

In addition, the holding rate is further classified into a "static holding rate at which fluid does not flow and a "dynamic holding rate" at which fluid continuously flows. The "dynamic holding rate" includes, for example, the volume of liquid held on and pushed against the surface of the sheet by distributed gas. Generally speaking, there is a relationship "the static holding rate<the dynamic holding rate".

Also, the sheets 11 and 12 have remarkably large liquid permeability. Consequently, the "static holding rate" of the sheets 11 and 12 are markedly larger than that of a non-permeable metal sheet. Note that, the static holding rate is preferably 5% or more. When the rate is 5% or more, an operating flow rate range of liquid and gas may be large. Thus, operating conditions can be set without significant consideration of a flow rate balance between the liquid and the gas. This configuration can increase a gas-liquid contact area to efficiently achieve a gas-liquid contact.

In view of the above, the sheets 11 and 12 have a higher "static holding rate". Thus, the gas flow rate may be small, and a pressure loss can be minimized.

By contrast, because the gas flow unlikely causes flooding as described below, it is possible to increase the gas flow rate (i.e., to have a large flow rate). This enables the cross section area of the gas passage to be small.

Further, it is possible to shorten the length of the filler 10 (sheets 11 and 12) in a gas flow direction and to decrease the number of fillers 10. That is, the filling volume can be reduced.

Furthermore, a flow rate of the liquid sequentially supplied to the sheets 11 and 12 may be small.

When the filler 10 is used for recovering NMP, for example, the above configuration can decrease a circulation rate (a flow ratio of water (liquid) to NMP-containing gas (gas)). This can achieve energy saving.

In this respect, in a non-permeable metal sheet, liquid remains attached on the surface of the sheet. When the volume of the liquid is small, the liquid hardly spread throughout the sheet. The liquid forms a passage in an inter-sheet space, and is fell from the sheet. Consequently, a gas-liquid contact area may be insufficiently created.

In order to improve this point, the gas flow rate may be made larger and the "dynamic holding rate" may be increased. In this case, the gas pushes the liquid against the sheet. As a result, the liquid fails to be replaced, which causes an increase in gas pressure loss. This may be responsible for a flooding status. Hence, the non-permeable metal sheet has a narrow controllable range regarding flow rates of the gas and the liquid.

In addition, the sheets 11 and 12 possess permeability property. A flow rate of the liquid injected into the sheets 11 and 12 may thus be small. In this case, the liquid spontaneously permeates and spreads through the sheets 11 and 12, thereby being distributed throughout the sheets 11 and 12. Because of this, it is not necessary to install a liquid dispersion device. The levelness may be different from that at the designing stage. The sheets can be used without any problem on a site where a swing such as a ship swing occurs.

Further, because the sheets 11 and 12 possess such permeability property, the liquid moves while penetrating through the sheets 11 and 12. Accordingly, liquid splashes generated due to the gas flow are reduced. This can result in a reduced safety factor (safety rate), so that the filling volume of the filler 10 can be decreased. Also, such a reduction of the liquid splashes can avoid use of a splash remover, what is also called an eliminator (demister) for removing mists. Furthermore, a plurality of fillers 10 may be disposed using a plurality of compartments. In this case, the splashes may be so reduced. Accordingly, a gap between adjacent compartments may be small, which makes the whole apparatus smaller.

Moreover, the adjacent sheets 11 and 12 partially come into contact with each other. Accordingly, the liquid disperses and is distributed between the adjacent sheets 11 and 12 via this contact region.

Then, the liquid flows vertically downward inside the sheets 11 and 12 at a slow speed caused by its self-weight. After that, the liquid flows out to the outside of the sheets.
<Filler: For Opposite Flows>

As illustrated in FIGS. 4 to 6, when a gas flow direction is opposite to a liquid flow direction in the filler 10, the gas flow direction is a vertically upward direction and the liquid flow direction is a vertically downward direction.

In this case, when the gas flow direction, which is a vertically upward direction, (a top-bottom direction in FIGS. 4 to 6) is used as a symmetry axis, the top line (bottom line) of the sheet 11 and the top line (bottom line) of the sheet 12 are symmetrically arranged. The angle θ2 between the top line (bottom line) of the sheet 11 and the gas flow direction is 30 degrees. The angle θ3 between the top line (bottom line) of the sheet 12 and the gas flow direction is 30 degrees (see FIG. 6).

With regard to the other points, the same as in the lateral arrangement for perpendicular flows applies to this case.

First Embodiment, Perpendicular Flows, NMP Recovery System

Figure 7:
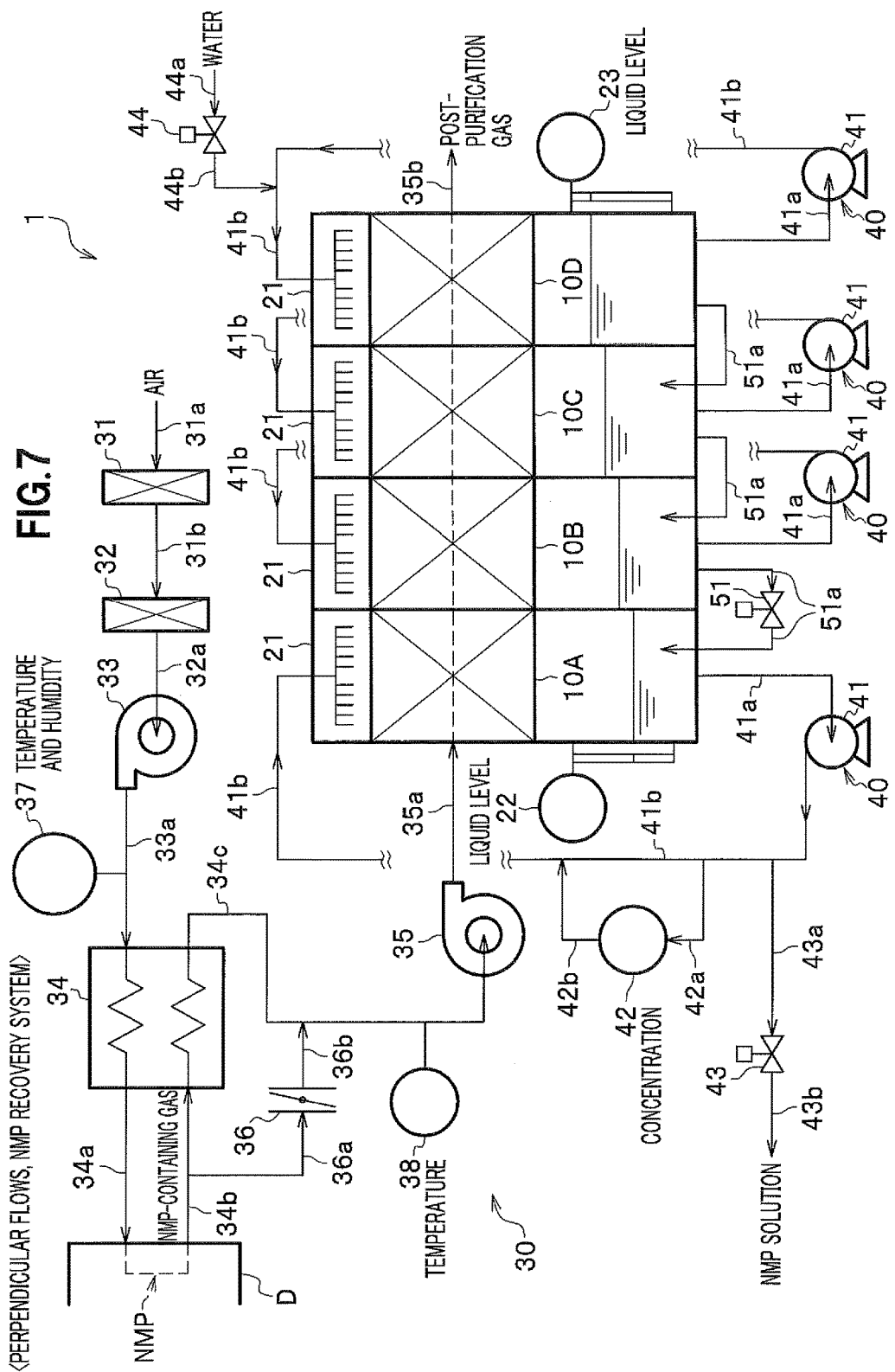
FIG. 7 illustrates how to configure an NMP recovery system for perpendicular flows in accordance with the first embodiment.

The following describes the first embodiment according to the present invention by referring to FIG. 7.

Note that the first embodiment includes four laterally arranged fillers 10A to 10D (see FIGS. 1 to 3). Also, the fillers are serially arranged in a left-right direction (a horizontal direction) of an NMP-containing gas flow as shown in FIG. 7. In the fillers 10A to 10D, the NMP-containing gas flow is perpendicular to a water (liquid) flow.

Structure of NMP Recovery System

An NMP recovery system 1 (gas-liquid contact device) according to the first embodiment is a system in which water (i.e., an absorption medium, liquid) is made to contact NMP-containing gas (i.e., absorbable material-containing gas, gas) containing NMP (an absorbable material) generated in drying equipment D during production of a lithium ion battery and the NMP is then absorbed and separated for recovery.

The NMP recovery system 1 includes: an NMP-containing gas distribution unit 30 (gas distribution unit) that distributes NMP-containing gas; four fillers 10A to 10D; a plurality (four in FIG. 1) of water distribution units 40 (a liquid distribution unit); and a plurality of pipes 41a (a liquid supply unit), each pipe being a water supply unit that supplies a first casing 21 positioned upstream of a second casing 21 in an NMP-containing gas flow direction with water retained in the second casing.

In this regard, however, the number of fillers is not limited to the number of the fillers 10A to 10D, and is optionally changed.
<NMP-Containing Gas Distribution Unit>

The NMP-containing gas distribution unit 30 includes: a first filter 31; a second filter 32; a first blower 33; a heat exchange device 34; a second blower 35; a flow control valve 36; a temperature and humidity sensor 37; and a temperature sensor 38.

When the first blower 33 is operated by a command of a controller (not shown), outside air (air) passes through from a pipe 31a, the first filter 31, a pipe 31b, the second filter 32, a pipe 32a, the first blower 33, a pipe 33a, the heat exchange device 34, and a pipe 34a to the drying equipment D so as to supply the air.

The first filter 31 is to remove microparticles (e.g., dust, dirt). The second filter 32 is to prevent salt damage.

The heat exchange device 34 performs heat exchange between air heading to the drying equipment D and high-temperature (80 to 120° C.) NMP-containing gas discharged from the drying equipment D, so that the air heading to the drying equipment should be heated. In this way, as a temperature of the air heading to the drying equipment D increases, NMP (gas) is more easily incorporated in the air in the drying equipment D. Also, it is possible to reduce an amount of heat from an air heater (not shown) for heating NMP in the drying equipment D.

A heat exchange system of the heat exchange device 34 is not particularly limited. Examples of the heat exchange device 34 that can be used include a plate heat exchange device.

The temperature and humidity sensor 37 is installed beside the pipe 33a and detects a temperature and humidity (a relative humidity) of air heading to the heat exchange device 34. Then, the sensor outputs data to the controller (not shown).

In the drying equipment D, NMP (gas) evaporated during production of a lithium ion battery is mixed with and incorporated in air to generate NMP-containing gas.

In addition, when the second blower 35 is operated by a command of the controller (not shown), the NMP-containing gas from the drying equipment D passes through from a pipe 34b, the heat exchange device 34, a pipe 34c, the second blower 35, and a pipe 35a to the filler 10A so as to supply the gas.

Note that heat exchange in the heat exchange device 34 causes the temperature of the NMP-containing gas to decrease. Then, the temperature of the NMP-containing gas heading to the filler 10A becomes within a predetermined temperature range (e.g., about 45 to 55° C.).

Further, the pipe 34b is connected via a pipe 36a, a flow control valve 36, and a pipe 36b to the pipe 34c. Specifically, the pipes 36a and 36b are used to create a bypass line in which the NMP-containing gas bypasses the heat exchange device 34. This bypass line has the flow control valve 36. The flow control valve 36 is, for example, a butterfly valve whose opening degree can be changed by the controller. A flow rate of the NMP-containing gas bypassing the heat exchange device 34 can be regulated by changing the opening degree.

Note that as a flow rate of the NMP-containing gas bypassing the heat exchange device 34 increases, a temperature of the NMP-containing gas heading to the filler 10A becomes higher. In addition, the opening degree of the flow control valve 36 may be controlled to set the NMP-containing gas temperature detected by the temperature sensor 38 to within a predetermined temperature range (e.g., about 45 to 55° C.).

The temperature sensor 38 is installed beside the pipe 34c positioned downstream of a junction point of the pipe 36b. The temperature sensor 38 detects a temperature of the NMP-containing gas heading to the filler 10A and then outputs data to the controller.

<Filler>

Fillers 10A to 10D are laterally and serially arranged in an NMP-containing gas flow direction (a horizontal direction) (see FIGS. 1 to 3). The fillers are positioned in the order of 10A, 10B, 10C, and 10D from the upstream to the downstream. That is, the arrangement of the fillers 10A to 10D has four compartments (a plurality of compartments) in the NMP-containing gas flow direction.

A casing 21 is used to encase each of the fillers 10A to 10D.

Meanwhile, a water distribution unit 40 supplies water to a portion over each of the fillers 10A to 10D. The supplied water permeates and spreads throughout (is held by) the fillers 10A to 10D, and also moves vertically downward due to its self-weight. This water is made to contact the NMP-containing gas while moving vertically downward through the fillers 10A to 10D, and absorbs (recovers) NMP.

Then, the NMP-containing water flows vertically downward to the outside of the fillers 10A to 10D. After that, the NMP-containing water is temporally stored at a lower portion of each casing 21. That is, the water passing through each of the fillers 10A to 10D moves vertically downward due to its self-weight and flows out from each filler, so that the water is sequentially replaced.

The water retained in a lower portion of each casing 21 has an increased concentration of NMP as the casing is positioned more upstream in the flow direction of the NMP-containing gas. As the NMP-containing gas travels in a downstream direction, a pressure of the gas gradually decreases due to a pressure loss occurring in the fillers 10A to 10D. Accordingly, as the casing 21 is positioned more downstream in the gas flow direction, the level of the NMP-containing water retained in the casing 21 gradually becomes higher (see FIG. 7).

Further, a first level sensor 22 is installed beside the casing 21 housing the filler 10A at the upstream end in the gas flow. Also, a second level sensor 23 is installed beside the casing 21 housing the filler 10D at the downstream end in the gas flow. The first level sensor 22 detects a volume (a liquid level height) of water retained in the upstream end casing 21, and then outputs data to the controller. The second level sensor 23 detects a volume (a liquid level height) of water retained in the downstream end casing 21, and then outputs data to the controller.

Meanwhile, the NMP-containing gas serially passes through the fillers 10A to 10D to be purified. As the NMP-containing gas travels further, a level of NMP in the gas gradually decreases. After the NMP-containing gas is well purified, the gas flows through a pipe 35b and is discharged outside the system as a post-purification gas.

<Water Distribution Unit>

The fillers 10A to 10D each have a water distribution unit 40. The water distribution unit 40 pumps water retained in each casing 21 and supplies the water at a portion over each of the fillers 10A to 10D. Then, the water penetrates through the fillers 10A to 10D. By doing so, this unit can circulate the water through each of the fillers 10A to 10D.

Each water distribution unit 40 has a pump 41. When each pump 41 is actuated by a command of the controller, the water retained in each casing 21 passes through from a pipe 41a, the pump 41, and a pipe 41b to the portion over each of the fillers 10A to 10D so as to supply the water. Note that the downstream end of the pipe 41b branches so as to make the water distributed and permeate throughout each of the fillers 10A to 10D.

In this manner, water circulates through each of the fillers 10A to 10D. According to this configuration, as the circulation proceeds, a concentration of NMP absorbed in the water gradually increases. Consequently, the enrichment of NMP is promoted.

In addition, the pipe 41b attached to the upstream end filler 10A has a concentration sensor 42 that detects a level of NMP contained in the circulating water (an aqueous solution). Specifically, pipes 42a and 42b are used to connect the concentration sensor 42 to the pipe 41b. A portion of the circulating water goes through the concentration sensor 42.

Further, the pipe 41b installed for the upstream end filler 10A has an NMP-solution-recovery unit that recovers an NMP solution (i.e., a liquid concentrate, a recovery liquid) from the pipe 41b to the outside of the system. The NMP-solution-recovery unit has a recovery valve 43. When an NMP concentration detected by the concentration sensor 42 is a predetermined concentration or more (e.g., 80% by mass), the recovery valve 43 is opened by the controller. Once the recovery valve 43 is opened, the NMP solution having an NMP concentration equal to or higher than the predetermined concentration is discharged through from a pipe 43a, the recovery valve 43, and a pipe 43b to a tank (the outside of the system) (not shown), etc.

Furthermore, the pipe 41b installed for the downstream end filler 10D has a water-supplementing unit. The water-supplementing unit has a supplementing valve 44. When a water level detected by the second level sensor 23 is a predetermined level or lower, the supplementing valve 44 is opened by the controller. Once the supplementing valve 44 is opened, water from an outside water (e.g., distilled water) source is supplied through from a pipe 44a, the supplementing valve 44, and a pipe 44b to the pipe 41b. Consequently, water retained in the casing 21 for the filler 10D is maintained at a predetermined level.

<Water Supply Unit (Pipe 51a)>

This embodiment has three pipes 51a which are water supply units. Specifically, each pipe 51a is used to connect the bottoms of the casings 21 adjacent in a flow direction of the NMP-containing gas. Then, once a level of water retained in the casing 21 positioned at the upstream side is lowered, water retained in the casing 21 positioned at the downstream side is supplied via the pipe 51a to the casing 21 positioned at the upstream side.

In addition, the upstream end pipe 51a has a supply valve 51. When a water level detected by the first level sensor 22 is a predetermined level or lower, the supply valve 51 is opened by the controller.

Advantageous Effects of First Embodiment

Such an NMP recovery system 1 exerts the following advantageous effects.

The configuration is described as follows: the fillers 10A to 10D are serially arranged in a flow direction of the NMP-containing gas; in addition, a water flow direction is perpendicular to an NMP-containing gas flow direction in the fillers 10A to 10D; further, water is made to circulate; and furthermore, a portion of the circulating water is transferred to the upstream casing. This configuration can increase and enrich an NMP concentration while recovering NMP.

Modification Embodiment of First Embodiment

Hereinabove, the first embodiment according to the present invention has been described. The present invention, however, is not limited to this first embodiment, and the following modifications, for example, are possible.

In the above-described embodiment, the absorbable material is NMP (an organic solvent), the absorbable material-containing gas (gas) is NMP-containing gas, and the absorption medium (liquid) is water as an example. The present invention is not limited to the above, but may be optionally modified. A device for separating and recovering another type of gas may be allowed.

Specific examples of the absorbable material may include DMF (N,N-dimethyl formamide), DMSO (dimethyl sulfoxide), and DMAc (dimethyl acetamide).

In the above-described embodiment, the system has four (a plurality of) fillers 10 as an example. However, the system may include only one filler 10. That is, the number of filers 10 is not limited.

In the configuration of the above-described embodiment, a water (liquid) flow direction is perpendicular to an NMP-containing gas (gas) flow direction. Other examples may be heat exchange devices (e.g., a direct contact heat exchange device, a cooling tower) in which an air (a gas) flow direction is perpendicular to a flow direction of cold water (a cooling medium) or warm water (a heating medium); and heat exchange is carried out between the air and the cold or warm water, thereby cooling or heating the air. Specifically, another example may be a gas-cooling condenser (a heat exchange device) in which cold water is used to cool air (gas) and water vapor in the air is then condensed. Note that the same applies to the below-described first reference embodiment.

First Reference Embodiment, Opposite Flows, NMP Recovery System

Figure 8:
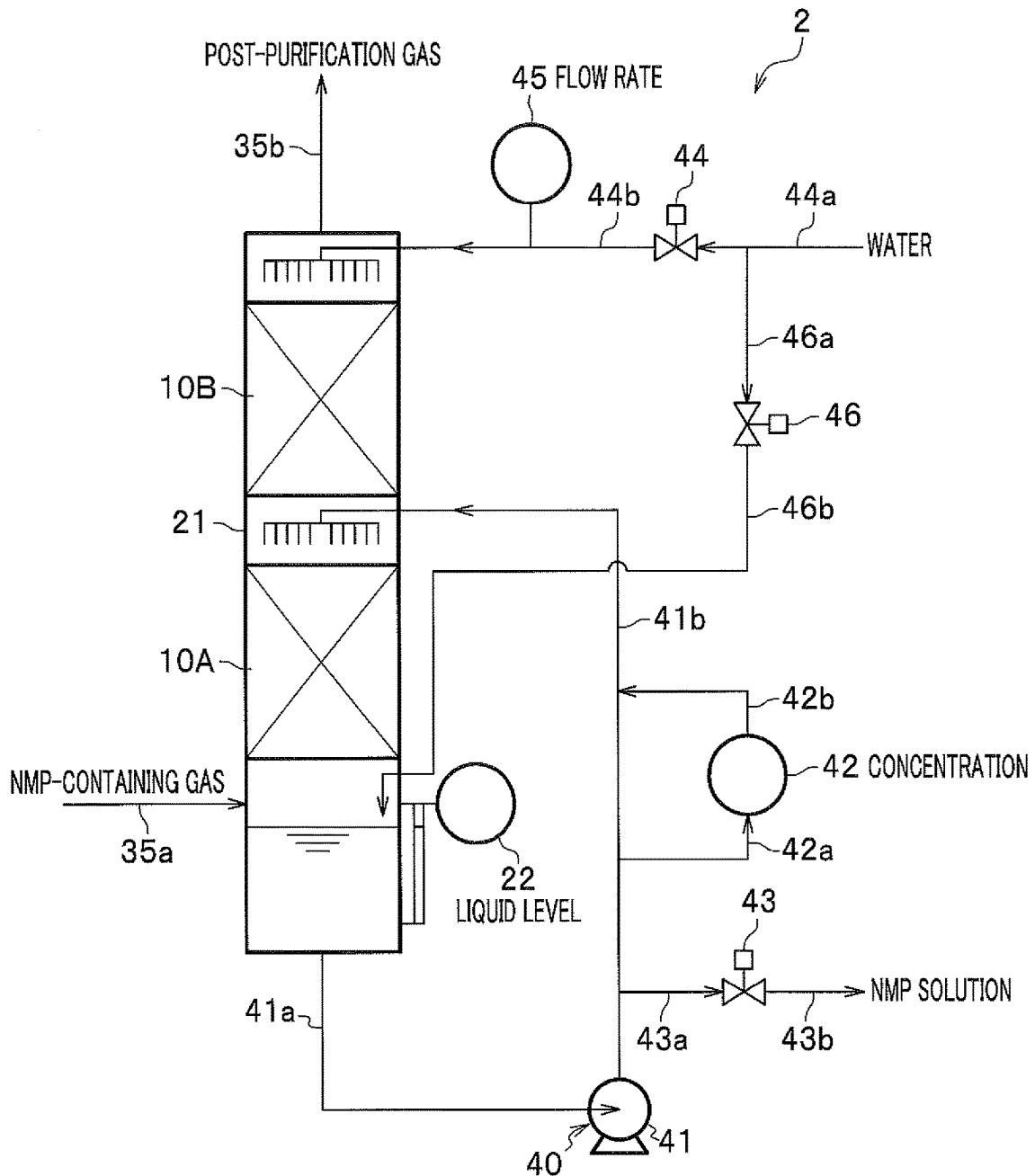
FIG. 8 illustrates how to configure an NMP recovery system for opposite flows in accordance with the first reference embodiment.

The following describes the first reference embodiment according to the present invention by referring to FIG. 8. Note that the following description is given to parts different from those of the first embodiment.

In an NMP recovery system 2 (a gas-liquid contact device) according to the first reference embodiment, two fillers 10A and 10B are vertically arranged (see FIGS. 4 to 6). Also, the fillers are serially arranged in a vertically upward direction of an NMP-containing gas (gas) flow as shown in FIG. 8. In the fillers 10A and 10B, the NMP-containing gas flow is opposite to a water (liquid) flow.

In the NMP recovery system 2, the NMP-containing gas from a pipe 35a flows vertically upward through a casing 21. The fillers 10A and 10B are housed in the same casing 21, and arranged in the order of 10A and 10B from the upstream side of the NMP-containing gas flow.

The downstream end of a pipe 41b is disposed between the fillers 10A and 10B. Water from a pump 41 is supplied to a portion over the filler 10A. This configuration enables the NMP-containing water to be temporally retained at the bottom of the casing 21 and to be circulated via the filler 10A. As a result, the composition of the NMP-containing gas heading to the downstream filler 10B is substantially kept constant.

The downstream end of a pipe 44b is disposed at a portion over the filler 10B. Water from an outside water source passes through from a pipe 44a, a flow rate-regulating supplementing valve 44, and a pipe 44b to the upper portion of the filler 10B.

The pipe 44b is provided with a flow rate sensor 45, which detects a flow rate of water in the pipe 44b.

Here, a flow rate of water supplied from the outside water source to the filler 10B is determined based on a flow rate and/or a temperature of the NMP-containing gas injected into the filler 10A. As the flow rate of the NMP-containing gas increases and/or the temperature becomes higher, the flow rate of the water increases.

In this regard, however, the flow volume of the water supplied to the filler 10B is set to not more than a flow volume of water contained in a post-purification gas that passes through a pipe 35b.

When a liquid level (water level) detected by a first level sensor 22 is a predetermined liquid level or higher and an NMP concentration detected by a concentration sensor 42 is a predetermined concentration or higher, a recovery valve 43 is opened to recover an NMP solution.

Partway through the pipe 44a is connected a line including, in sequence, a pipe 46a, a normally closed bypass valve 46, and a pipe 46b. The downstream end of the pipe 46b has an opening disposed over water retained at the bottom portion of the casing 21. When a liquid level (water level) detected by the first level sensor 22 is a predetermined liquid level or lower, the bypass valve 46 is opened to supplement water from the outside water source.

Second Embodiment, Perpendicular Flows, Distillation Device (or Distillator)

Figure 9:
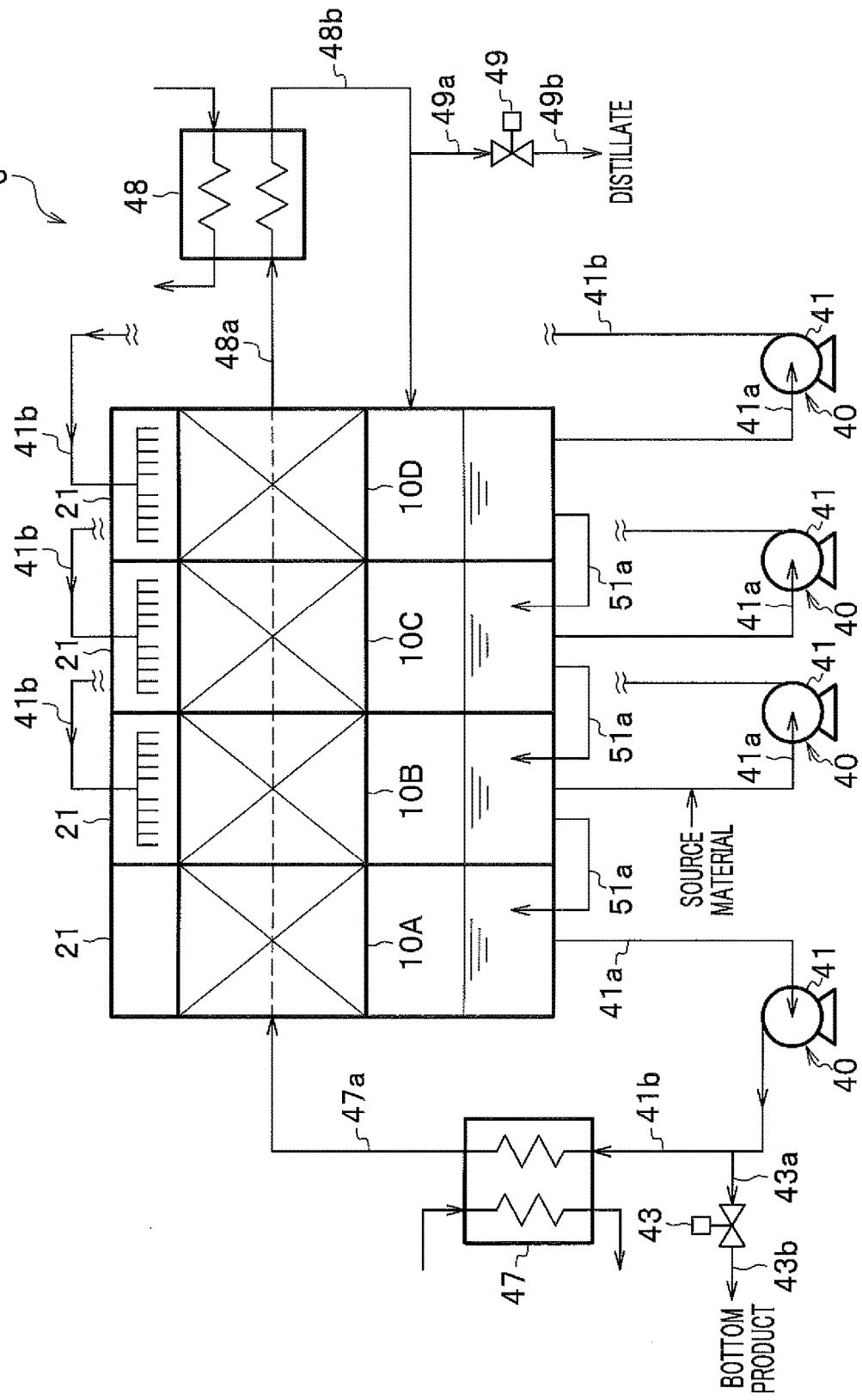
FIG. 9 illustrates how to configure a distillation device (or distillator) for perpendicular flows in accordance with the second embodiment.

The following describes the second embodiment according to the present invention by referring to FIG. 9. Note that the following description is given to parts different from those of the first embodiment.

A distillation device (e.g., purifier) 3 according to the second embodiment includes four laterally arranged fillers 10A to 10D (see FIGS. 1 to 3). Also, the fillers are serially arranged in a left-right direction (a horizontal direction) of a vapor (gas) flow as shown in FIG. 9. In the fillers 10A to 10D, the vapor flow is perpendicular to a source material or condensate (liquid) flow.

That is, the fillers 10A to 10D are disposed in a horizontal direction, so that the distillation device tower has a low overall height and can be deployed in a place with height restriction.

The source material is a mixed solution of a low boiling point substance and a high boiling point substance. Examples include a mixed solution (methanol aqueous solution) of water and methanol. In this regard, however, the kind of the source material may be optionally modified.

The distillation device (or distillator) 3 includes: a reboiler (evaporator) 47 that can vaporize the source material to generate vapor; and a condenser (condensing device) 48 that cools the vapor from the filler 10D to produce a condensate.

The vapor generated in the reboiler 47 passes through a pipe (vapor pipe) 47a, and is then supplied to the filler 10A in a left-right direction (horizontal direction) as shown in FIG. 9. After that, the vapor flows through the fillers in the order of 10A, 10B, 10C, and 10D. By doing so, the filler 10A primarily holds the high boiling point substance.

In each of the fillers 10B, 10C, and 10D, a pump 41 is actuated to circulate a mixed solution (i.e., a mixed solution of the source material and the condensate), so that the fillers 10B, 10C, and 10D hold the mixed solution. Here, the low boiling point substance is more enriched in the mixed solution as the vapor travels through the fillers 10B, 10C, and 10D toward the downstream end of the vapor flow. Thus, the concentration of the low boiling point substance gradually increases as the vapor travels through the fillers in the order of 10A, 10B, 10C, and 10D.

Note that the source material is injected into a pipe 42a used to circulate the mixed solution retained in the casing 21 housing the filler 10B.

The vapor discharged from the filler 10D contains a large amount of the low boiling point substance. This vapor containing a large amount of the low boiling substance passes through a pipe 48a and is condensed by the condenser 48 to produce a condensate containing a large amount of the low boiling point substance. Then, this condensate containing a large amount of the low boiling point substance passes through a pipe (condensate pipe) 48b and is returned to the casing 21 housing the filler 10D.

The mixed solution retained in a first casing 21 housing each of fillers 10B to 10C passes through a pipe 51a, and is transferred to a second casing 21 positioned next to the first casing in a upstream direction.

Accordingly, as a casing 21 (for filler 10A) is positioned at a more upstream side in the vapor flow direction, the mixed solution retained in the casing 21 has an increased concentration of the high boiling point substance and a decreased concentration of the low boiling point substance. Hence, the mixed solution retained in the casing 21 housing the filler 10A has the highest concentration of the high boiling point substance and the lowest concentration of the low boiling point substance.

Note that the pump 41 is actuated to make the mixed solution retained in the casing 21 housing the filler 10A pass through from pipes 41a and 41b to the reboiler 47.

Once a recovery valve 43 is opened, a high-purity high boiling point substance passes through from pipes 43a and 43b to the outside of the system and is recovered as a bottom product. Meanwhile, once a recovery valve 49 is opened, a high-purity low boiling point substance passes through from pipes 49a and 49b to the outside of the system and is recovered as a distillate.

Second Reference Embodiment, Opposite Flows, Distillation Device (or Distillator)

Figure 10:
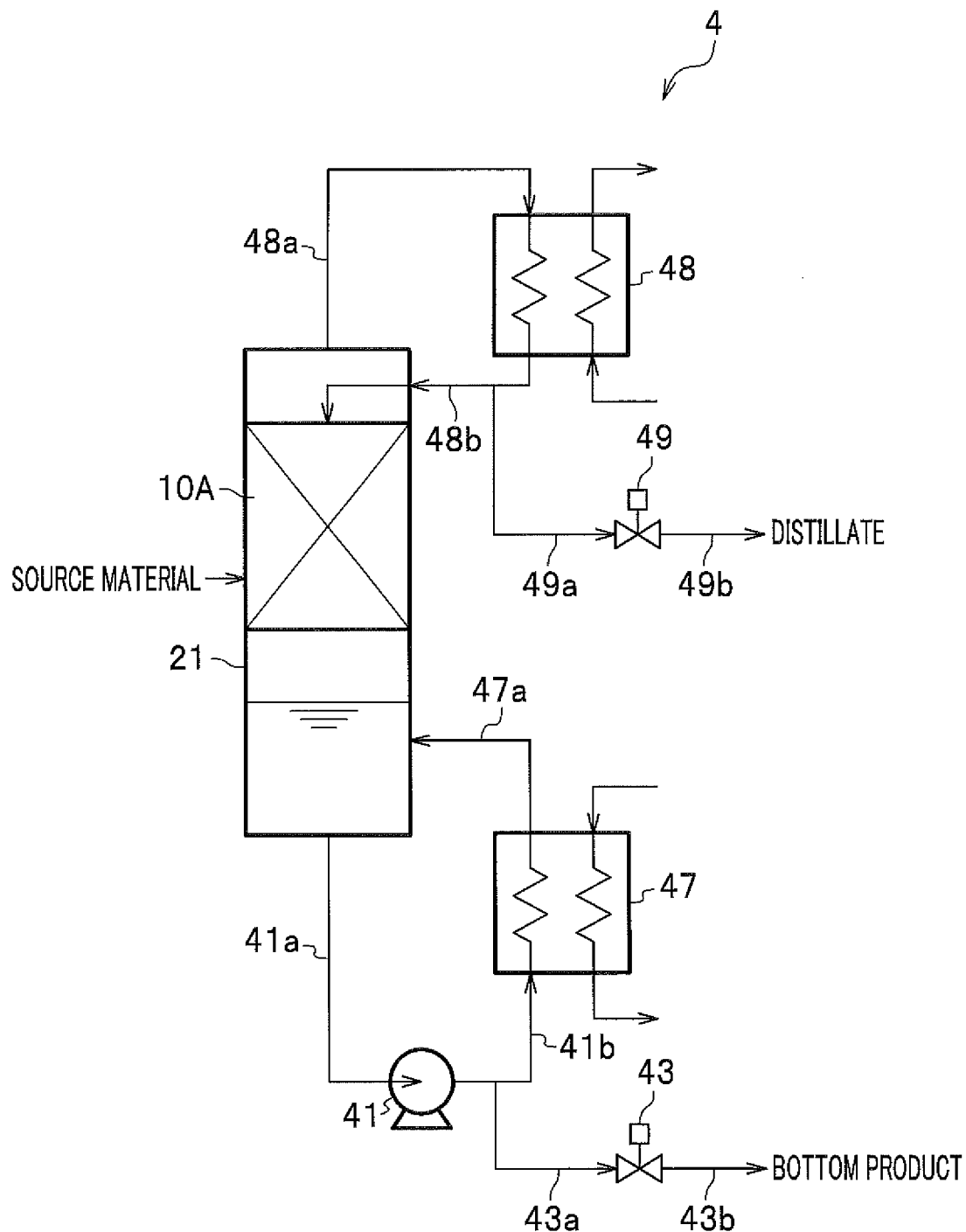
FIG. 10 illustrates how to configure a distillation device (or distillator) for opposite flows in accordance with the second reference embodiment.

The following describes the second reference embodiment according to the present invention by referring to FIG. 10. Note that the following description is given to parts different from those of the second reference embodiment.

A distillation device (or distillator) 4 according to the second reference embodiment includes one vertically arranged filler 10A (see FIGS. 4 to 6). In the filler 10A, a vapor flow is opposite to a source material or condensate (liquid) flow. In this regard, however, the number of fillers 10A is not limited to one, but may be more than one.

Vapor generated in the reboiler 47 is injected via a pipe 47a to a casing 21, and flows vertically upward through the casing 21. A condensate produced by the condenser 48 passes through a pipe 48b and is supplied to an upper portion of the filler 10A. A source material is supplied at an intermediate position of the filler 10A.

Then, the source material and the condensate flow vertically downward while being held by the filler 10A. By contrast, the vapor flows vertically upward through the filler 10A. This configuration allows the vapor to continuously contact the source material and the condensate.

Figure 11:
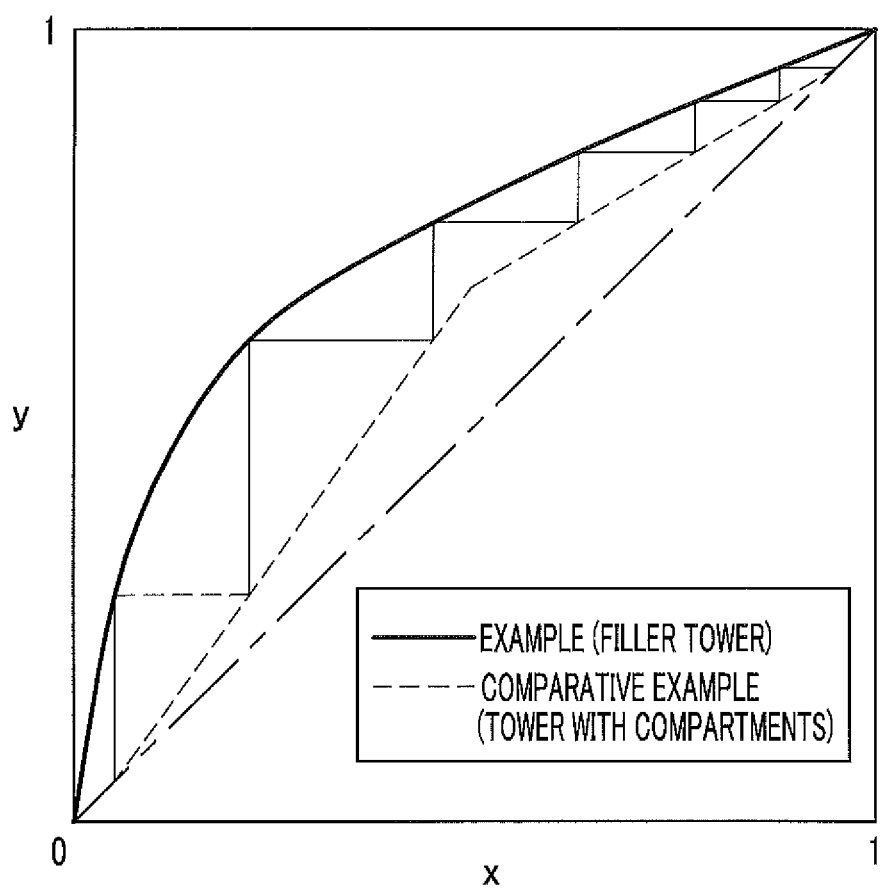
FIG. 11 is a graph showing effects of the distillation device for opposite flows according to the second reference embodiment.

Accordingly, as the vapor travels toward a vertically upper side in a height direction of the filler 10A, the ratio of the low boiling point substance gradually and continuously increases and the ratio of the high boiling point substance gradually and continuously decreases (see an Example in FIG. 11). The height of the filler 10A is preferably determined depending on an efficiency of a gas-liquid contact per height unit. By contrast, in a distillation tower with compartments, stepwise changes may be observed (see a Comparative Example in FIG. 11).

REFERENCE SIGNS LIST 1, 2 NMP recovery system (Gas-liquid contact device)
3, 4 Distillation device (or Distillator)

10A, 10B, 10C, 10D Filler
11, 12 Sheet
20 NMP-containing gas distribution unit (Gas distribution unit)
40 Water distribution unit (Liquid distribution unit)
47 Reboiler
48 Condenser
51 Supply valve (Liquid supply unit)
51a Pipe (Liquid supply unit)

We claim:

1. A gas-liquid contact device for causing gas containing an absorbable material of a volatile organic compound to contact liquid absorbing the absorbable material, comprising:
    a filler that is permeable to the liquid, and holds the liquid, wherein permeated liquid moves according to gravity to flow out from the filler;
    a gas distribution piping system configured to distribute the gas to the filler so as to cause the gas to contact the liquid held by the filler; and
    a liquid distribution piping system configured to distribute the liquid to the filler so as to make the liquid permeate through the filler,
    wherein in the filler, the gas containing the absorbable material is made to contact the liquid absorbing the absorbable material; and
    the absorbable material included in the gas is absorbed in the liquid and is separated from the gas;
    the filler has a static holding rate of 5% or more;
    the liquid distribution piping system injects the liquid at a portion over the filler and supplies the filler with the liquid that has absorbed the absorbable material and is discharged from the filler so as to circulate the liquid through the filler;
    the filler comprises a plurality of stacked ceramic sheets having a wavy cross-section;
    the gas flows through an inter-sheet space of the plurality of the sheets; and
    in the filler, a gas flow direction is perpendicular to a liquid flow direction,
    wherein the gas liquid contact device comprises a plurality of fillers arranged in series in the gas flow direction,
    wherein the liquid distribution piping system is installed for each filler,
    wherein liquid flowed out from each filler is supplied by a liquid supply piping system to an upstream liquid distribution piping system in the gas flow direction, and
    wherein the gas distribution piping system includes a heat exchanger which performs heat exchange between a flowing-in gas, of a low temperature, which flows into a drying equipment and a flowing-out gas, of a high temperature higher than the low temperature, which flows out from the drying equipment to the gas distribution piping system and is provided to each filler.

2. The gas-liquid contact device according to claim 1, wherein the gas distribution piping system comprises:
    a bypass line configured to bypass the heat exchanger to supply a portion of the flowing-out gas between the heat exchanger and the filler;
    a flow control valve provided on the bypass line; and
    a controller configured to control opening degree of the flow control valve based on a temperature of a gas mixture in which the portion of the flowing-out gas from the bypass line and the remaining portion of the flowing-out gas from the heat exchanger are mixed together.

* * * * *